(12) United States Patent
Bremer

(10) Patent No.: US 6,614,838 B1
(45) Date of Patent: Sep. 2, 2003

(54) SYSTEM AND METHOD OF COMMUNICATION VIA EMBEDDED MODULATION

(75) Inventor: Gordon Bremer, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/205,205

(22) Filed: Dec. 4, 1998

Related U.S. Application Data

(60) Provisional application No. 60/067,562, filed on Dec. 5, 1997.

(51) Int. Cl.[7] .............................. H04B 1/38; H04L 5/16
(52) U.S. Cl. ...................... 375/220; 375/222; 375/219; 370/453
(58) Field of Search ................................ 375/261, 222, 375/219, 220; 370/328, 338, 389, 449, 452, 453, 457

(56) References Cited

U.S. PATENT DOCUMENTS

| | | | |
|---|---|---|---|
| 5,563,883 A | * 10/1996 | Cheng | |
| 5,936,949 A | * 8/1999 | Pasternak et al. | |
| 5,999,563 A | * 12/1999 | Polley et al. | |
| 6,021,158 A | * 2/2000 | Schurr et al. | 375/211 |
| 6,067,297 A | * 5/2000 | Beach | |

\* cited by examiner

Primary Examiner—Phuong Phu
(74) Attorney, Agent, or Firm—Thomas, Kayden, Horstemeyer & Risley LLP

(57) ABSTRACT

A communication system includes a master transceiver in communication with one or more transceivers, for example, a first tributary transceiver and a second tributary transceiver over a communication medium. The first tributary transceiver uses a primary modulation method for communication while the second tributary transceiver uses a secondary or embedded modulation method for communication. The master transceiver and tributary transceivers each include a processor, memory, and control logic for controlling their operation. While the primary modulation method is normally used for transmissions on the communication medium, the master transceiver can communicate with the second tributary transceiver by notifying the first tributary transceiver that the primary modulation method is being temporarily replaced by the secondary or embedded modulation method. The master transceiver can then exchange information with the second tributary transceiver while the first tributary transceiver ignores any secondary modulation transmissions. In the meantime, the first tributary transceiver conditions itself to look for a trailing sequence from the master transceiver indicating that communication with the second tributary transceiver is complete. When the master transceiver transmits the trailing sequence using the primary modulation method, the first tributary transceiver conditions itself to look for primary modulation transmissions while the second tributary transceiver conditions itself to ignore primary modulation transmissions.

18 Claims, 7 Drawing Sheets

SYSTEM AND METHOD OF COMMUNICATION VIA EMBEDDED MODULATION

CROSS REFERENCE TO RELATED APPLICATION

This application claims priority to and the benefit of the filing date of U.S. Provisional Application No. 60/067,562, entitled "Embedded Modulations," filed Dec. 5, 1997, which is incorporated by reference as if set forth in full hereinbelow.

TECHNICAL FIELD

The present invention relates generally to the fields of data communications and modulator/demodulators (modems), and, more particularly, to a data communications system in which a plurality of modulation methods are used to facilitate communication among a plurality of modem types.

BACKGROUND OF THE INVENTION

In existing data communications systems, a transmitter and receiver modem pair can successfully communicate only when the modems are compatible at the physical layer. That is, the modems must use compatible modulation methods. This requirement is generally true regardless of the network topology. For example, point-to-point, dial-up modems operate in either the industry standard V.34 mode or the industry standard V.22 mode. Similarly, in a multipoint architecture, all modems operate, for example, in the industry standard V.27bis mode. While the modems may be capable of using several different modulation methods, a single common modulation is negotiated at the beginning of a data session to be used throughout the duration of the session. Should it become necessary to change modulation methods, the existing data session is torn down, and a new session is negotiated using the new modulation method. Clearly, tearing down an existing data session causes a significant disruption in communication between the two modems.

As discussed in the foregoing, communication between modems is generally unsuccessful unless a common modulation method is used. In a point-to-point network architecture, if a modem attempts to establish a communication session with an incompatible modem, one or both of the modems will make several attempts to establish the communication link until giving up after a timeout period has expired or the maximum number of retry attempts has been reached. Essentially, communication on the link is impossible without replacing one of the modems such that the resulting modem pair uses a common modulation method.

In a multipoint architecture, a single central, or "master," modem communicates with two or more tributary or "trib" modems using a single modulation method. If one or more of the trib modems are not compatible with the modulation method used by the master, those tribs will be unable to receive communications from the master. Moreover, repeated attempts by the master to communicate with the incompatible trib(s) will disturb communications with compatible trib(s) due to time wasted in making the futile communication attempts.

Thus, communication systems comprised of both high performance and low or moderate performance applications can be very cost inefficient to construct. For example, some applications (e.g., internet access) require high performance modulation, such as quadrature amplitude modulation (QAM), carrier amplitude and phase (CAP) modulation, or discrete multitone (DMT) modulation, while other applications (e.g., power monitoring and control) require only modest data rates and therefore a low performance modulation method. All users in the system will generally have to be equipped with a high performance modem to ensure modulation compatibility. These state of the art modems are then run at their lowest data rates for those applications that require relatively low data throughput performance. The replacement of inexpensive modems with much more expensive state of the art devices due to modulation compatibility imposes a substantial cost that is unnecessary in terms of the service and performance to be delivered to the end user.

Accordingly, what is sought, and what is not believed to be provided by the prior art, is a system and method of communication in which multiple modulation methods are used to facilitate communication among a plurality of modems in a network, which have heretofore been incompatible.

SUMMARY OF THE INVENTION

The present invention is generally directed to a system and method of communication between a master transceiver and a plurality of tributary transceivers in a multipoint communication system in which the tributary transceivers use different types of modulation methods. Broadly stated, the communication system includes a master transceiver in communication with a first tributary transceiver and a second tributary transceiver over a communication medium. The first tributary transceiver uses a primary modulation method for communication while the second tributary transceiver uses a secondary or embedded modulation method for communication. The master transceiver and tributary transceivers each include a processor, memory, and control logic for controlling their operation. While the primary modulation method is normally used for transmissions on the communication medium, the master transceiver can communicate with the second tributary transceiver by notifying the first tributary transceiver that the primary modulation method is being temporarily replaced by the secondary or embedded modulation method. The master transceiver can then exchange information with the second tributary transceiver while the first tributary transceiver ignores any secondary modulation transmissions. In the meantime, the first tributary transceiver conditions itself to look for a trailing sequence from the master transceiver indicating that communication with the second tributary transceiver is complete. When the master transceiver transmits the trailing sequence using the primary modulation method, the first tributary transceiver conditions itself to look for primary modulation transmissions while the second tributary transceiver conditions itself to ignore primary modulation transmissions.

The present invention has many advantages, a few of which are delineated hereafter as merely examples.

One advantage of the present invention is that it provides to the use of a plurality of modem modulation methods on the same communication medium.

Another advantage of the present invention is that a master transceiver can communicate seamlessly with tributary transceivers or modems using incompatible modulation methods.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The present invention can be better understood with reference to the following drawings. The components and representations in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
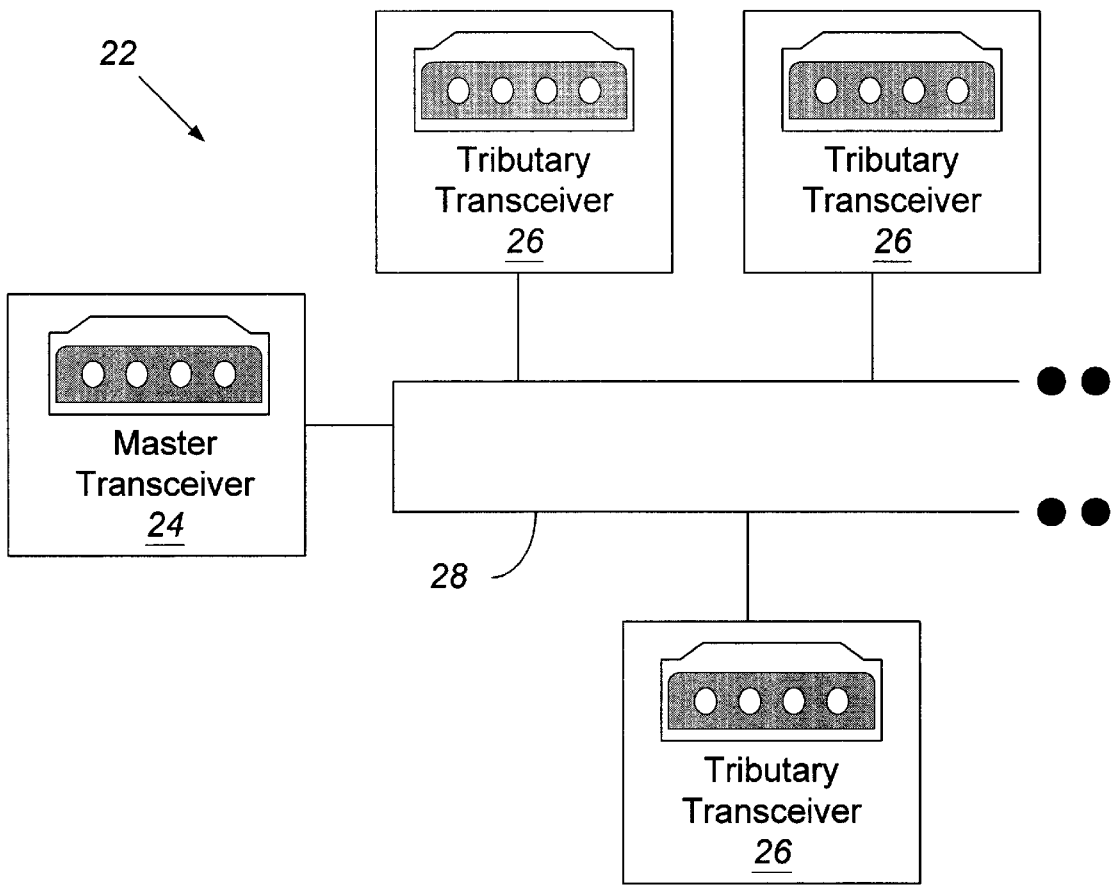
FIG. 1 is a block diagram of a prior art multipoint communication system including a master transceiver and a plurality of tributary transceivers.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

With reference to FIG. 1, a prior art multipoint communication system 22 is shown to comprise a master modem or transceiver 24, which communicates with a plurality of tributary modems (tribs) or transceivers 26—26 over communication medium 28. Note that all tribs 26—26 are identical in that they share a common modulation method with the master transceiver 24. Thus, before any communication can begin in multipoint system 22, the master transceiver and the tribs 26—26 must agree on a common modulation method. If a common modulation method is found, the master transceiver 24 and a single trib 26 will then exchange sequences of signals that are particular subsets of all signals that can be communicated via the agreed upon common modulation method. These sequences are commonly referred to as training signals and can be used for the following purposes: 1) to confirm that the common modulation method is available, 2) to establish received signal level compensation, 3) to establish time recovery and/or carrier recovery, 4) to permit channel equalization and/or echo cancellation, 5) to exchange parameters for optimizing performance and/or to select optional features, and 6) to confirm agreement with regard to the foregoing purposes prior to entering into data communication mode between the users. In a multipoint system, the address of the trib with which the master is establishing communication is also transmitted during the training interval. At the end of a data session a communicating pair of modems will typically exchange a sequence of signals known as trailing signals for the purpose of reliably stopping the session and confirming that the session has been stopped. In a multipoint system, failure to detect the end of a session will delay or disrupt a subsequent session.

Figure 2:
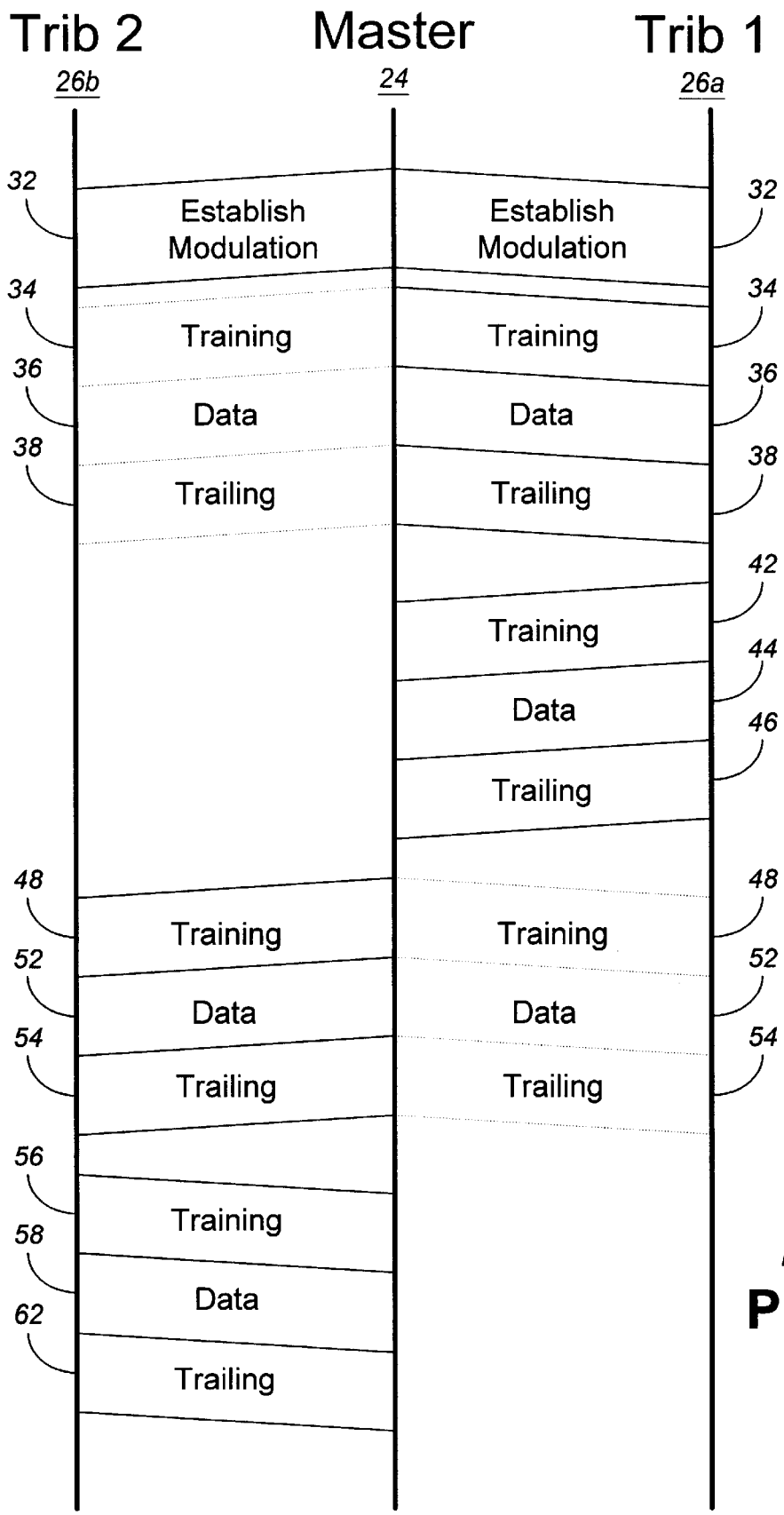
FIG. 2 is a ladder diagram illustrating the operation of the multipoint communication system of FIG. 1.

Referring now to FIG. 2, an exemplary multipoint communication session is illustrated through use of a ladder diagram. This system uses polled multipoint communication protocol. That is, a master controls the initiation of its own transmission to the tribs and permits transmission from a trib only when that trib has been selected. At the beginning of the session, the master transceiver 24 establishes a common modulation as indicated by sequence 32 that is used by both the master 24 and the tribs 26a, 26b for communication. Once the modulation scheme is established among the modems in the multipoint system, The master transceiver 24 transmits a training sequence 34 that includes the address of the trib that the master seeks to communicate with. In this case, the training sequence 34 includes the address of trib 26a. As a result, trib 26b ignores training sequence 34. After completion of the training sequence 34, master transceiver 24 transmits data 36 to trib 26a followed by trailing sequence 38, which signifies the end of the communication session. Note that trib 26b ignores data 36 and trailing sequence 38 as it was not requested for communication during training sequence 34.

At the end of trailing sequence 38, trib 26a transmits training sequence 42 to initiate a communication session with master transceiver 24. Because master transceiver 24 selected trib 26a for communication as part of training sequence 34, trib 26a is the only modem that will return a transmission. Thus, trib 26a transmits data 44 destined for master transceiver 24 followed by trailing sequence 46 to terminate the communication session.

The foregoing procedure is repeated except master transceiver identifies trib 26b in training sequence 48. In this case, trib 26a ignores the training sequence 48 and the subsequent transmission of data 52 and trailing sequence 54 because it does not recognize its address in training sequence 48. Master transceiver 24 transmits data 52 to trib 26b followed by trailing sequence 54 to terminate the communication session. To send information back to master transceiver 24, trib 26b transmits training sequence 56 to establish a communication session. Master transceiver 24 is conditioned to expect data only from trib 26b because trib 26b was selected as part of training sequence 48. Trib 26b transmits data 58 to master transceiver 24 terminated by trailing sequence 62.

The foregoing discussion is based on a two-wire, half-duplex multipoint system. Nevertheless, it should be understood that the concept is equally applicable to four-wire systems.

Consider the circumstance in which master transceiver 24 and trib 26b share a common modulation type A while trib 26a uses a second modulation type B. When master transceiver attempts to establish A as a common modulation during sequence 32, trib 26a will not be able to understand that communication. Moreover, trib 26a will not recognize its own address during training interval 34 and will therefore ignore data 36 and trailing sequence 38. Master transceiver 24 may time out waiting for a response from trib 26a because trib 26a will never transmit training sequence 42, data 44, and trailing sequence 46 due to the failure of trib 26a to recognize the communication request (training sequence 34) from master transceiver 24. Thus, if the tribs in a multipoint communication system use a plurality of modulation methods, the overall communication efficiency will be disrupted as specific tribs will be unable to decipher certain transmissions from the master transceiver and any unilateral transmission by a trib that has not been addressed by the master transceiver will violate the multipoint protocol.

As discussed hereinbefore, however, it is desirable to design a multipoint communication system comprising tribs that use a plurality of modulation methods. For example, one moderately priced trib may be used to communicate at a relatively high data rate for some applications, such as Internet access, while another, lower priced, trib is used to communicate at a lower data rate for other applications, such as power monitoring and control. The needs of these different applications cannot be efficiently met by a single modulation. While it is possible to use high performance tribs running state of the art modulation methods such as QAM, CAP, or DMT to implement both the high and low data rate applications, significant cost savings can be achieved if lower cost tribs using low performance modulation methods are used to implement the lower data rate applications.

Figure 3:
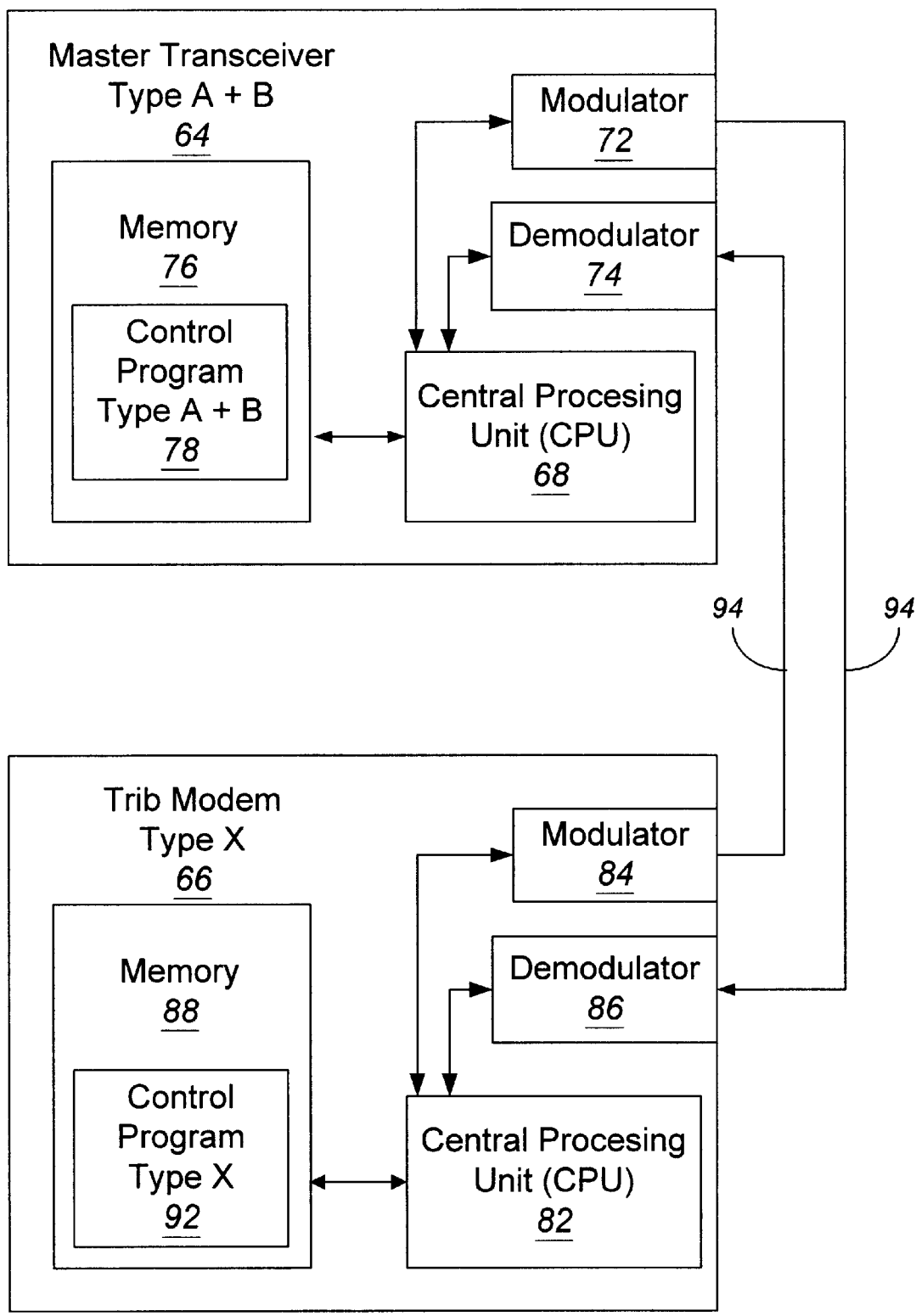
FIG. 3 is a block diagram of a master transceiver and tributary transceiver for use in the multipoint communication system of FIG. 1 in accordance with the principles of the present invention.

A block diagram of a master transceiver 64 in communication with a trib 66 in accordance with the principles of the present invention is shown in FIG. 3. Master transceiver 64 comprises a central processing unit (CPU) 68 in communication with modulator 72, demodulator 74, and memory 76. Memory 76 holds software control program 78 and any data necessary for the operation of master transceiver 64. Control program 78 includes logic for implementing a plurality of modulation methods. For purposes of illustration, control program 78 can implement both a type A and a type B modulation through modulator 72 and demodulator 74.

Trib 66 comprises CPU 82 in communication with modulator 84, demodulator 86, and memory 88. Memory 88, likewise holds software control program 92 and any data necessary for the operation of trib 66. Control programs 78 and 92, are executed by CPUs 68 and 82 and provide the control logic for the processes to be discussed herein. Control program 92 includes logic for implementing a particular modulation method, which, for purposes of illustration, is called type X. Inasmuch as master transceiver 64 is capable of running either a type A or a type B modulation method, type X refers to one of those two modulation methods. The master transceiver 64 communicates with trib 66 over communication medium 94.

Figure 4:
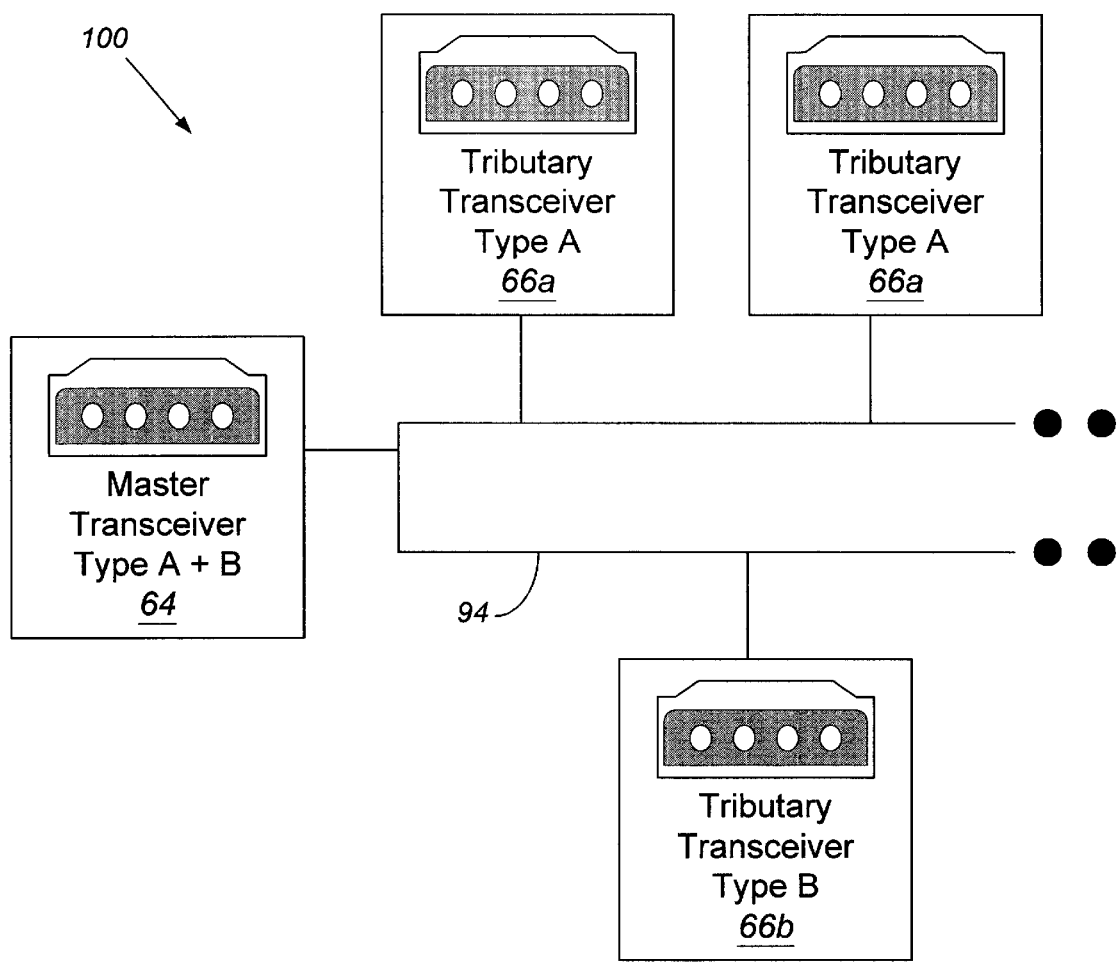
FIG. 4 is a block diagram of a multipoint communication system including the master transceiver and a plurality of tributary transceivers of the type illustrated in FIG. 3.

Referring now to FIG. 4, a multipoint communication system 100 is shown comprising a master transceiver 64 along with a plurality of tribs 66—66. In this example, two tribs 66a—66a run a type A modulation method while one trib 66b runs a type B modulation method. The present invention permits a secondary or embedded modulation method (e.g., type B) to replace the standard modulation method (e.g., type A) after an initial training sequence. This allows the master transceiver 64 to communicate seamlessly with tribs of varying types.

Figure 5:
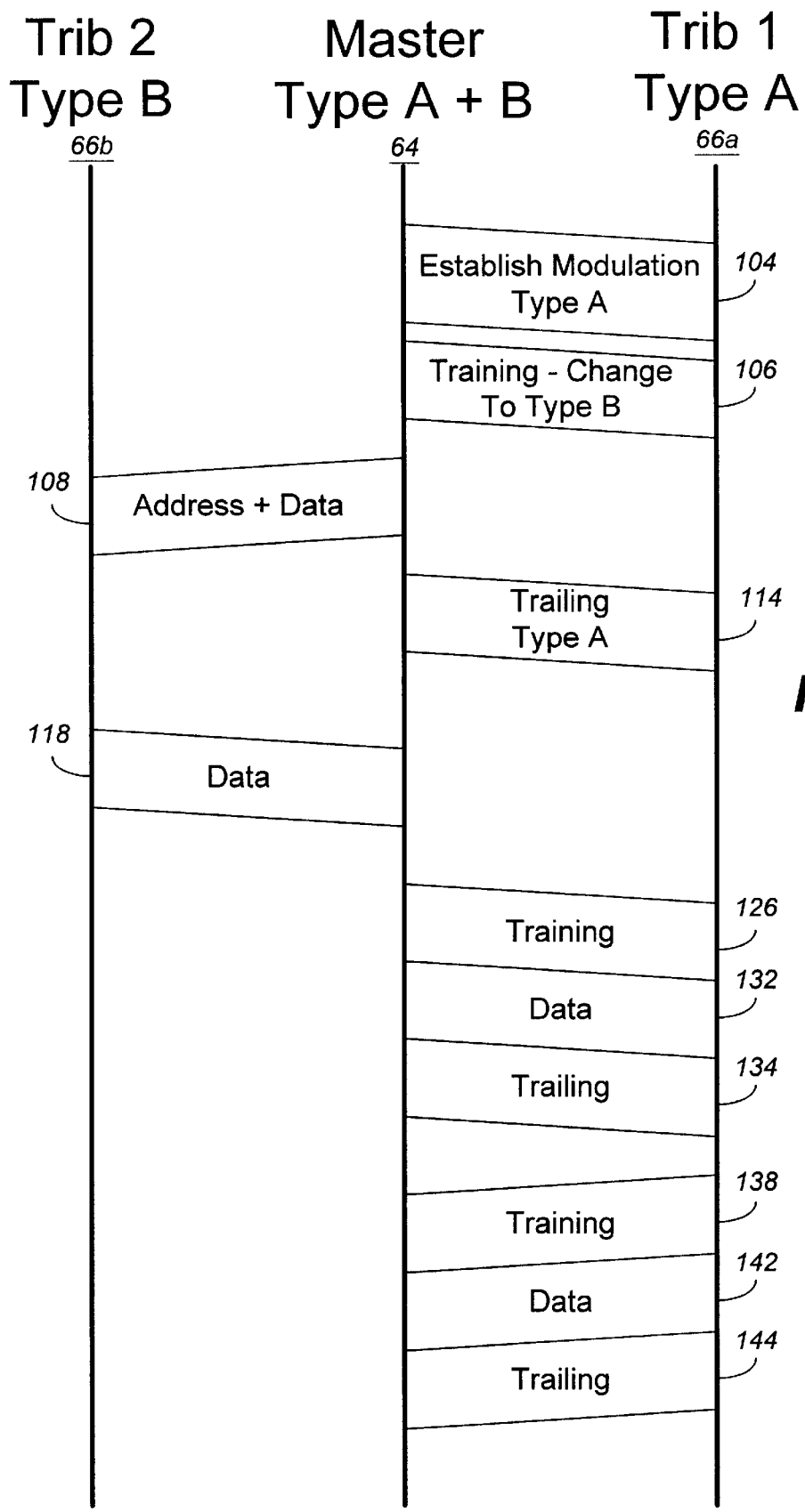
FIG. 5 is a ladder diagram illustrating the operation of the multipoint communication system of FIG. 4.
Figure 6:
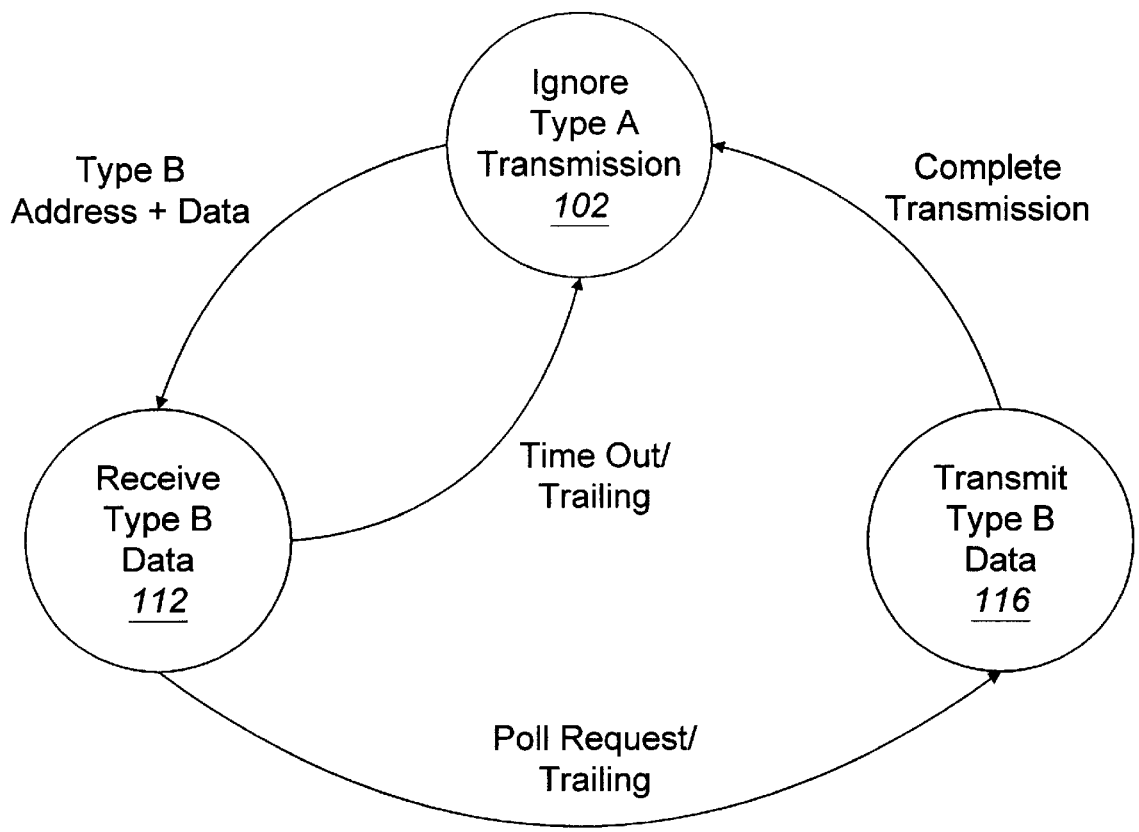
FIG. 6 is a state diagram for a tributary transceiver of FIGS. 3–5 using a secondary modulation method in accordance with the principles of the present invention.

The operation of multipoint communication system 100 will be described hereafter with reference to the ladder diagram of FIG. 5 and the state diagrams of FIGS. 6 and 7. A communication session between the master transceiver 64 and a type B trib 66b will be discussed first. A state diagram for a type B trib 66b is shown in FIG. 6. Type B trib 66b is initialized in state 102 in which type A modulation transmissions are ignored. In the present example, the primary modulation method is type A, thus, as shown in FIG. 5, master transceiver 64 establishes type A as the primary modulation in sequence 104. Note that because trib 66b responds only to type B modulation transmissions, only the type A tribs 66a—66a are receptive to transmission sequence 104.

To switch from type A modulation to type B modulation, master transceiver 64 transmits a training sequence 106 to type A tribs 66a in which these tribs are notified of an impending change to type B modulation. The switch to type B modulation could be limited according to a specific time interval or for the communication of a particular quantity of data. After notifying the type A tribs 66a of the change to type B modulation, master transceiver 64, using type B modulation, transmits data along with an address in sequence 108, which is destined for a particular type B trib 66b. The type B trib 66b targeted by the master transceiver 64 will transition to state 112 as shown in FIG. 6 upon detecting its own address where it processes the data transmitted in sequence 108.

After completing transmission sequence 108, master transceiver 64 transmits a trailing sequence 114 using type A modulation thus notifying all type A tribs 66a that type B modulation transmission is complete. If master transceiver 64 has not transmitted a poll request to the type B trib 66b in sequence 108, then the type B trib 66b that was in communication with the master transceiver 64 will return to state 102 after timing out based on the particular time interval defined for the type B modulation transmission or transfer of the particular quantity of data. Note that the trailing sequence 114 is ineffective in establishing the termination of a communication session between master transceiver 64 and a type B trib 66b because the trailing sequence is transmitted using type A modulation.

If, however, master transceiver 64 transmitted a poll request in sequence 108, then the type B trib 66b transitions to state 116 where it will transmit data, using type B modulation, to master transceiver 64 in sequence 118. After completion of this transmission, the type B trib 66b returns to state 102 where type A transmissions are ignored.

Figure 7:
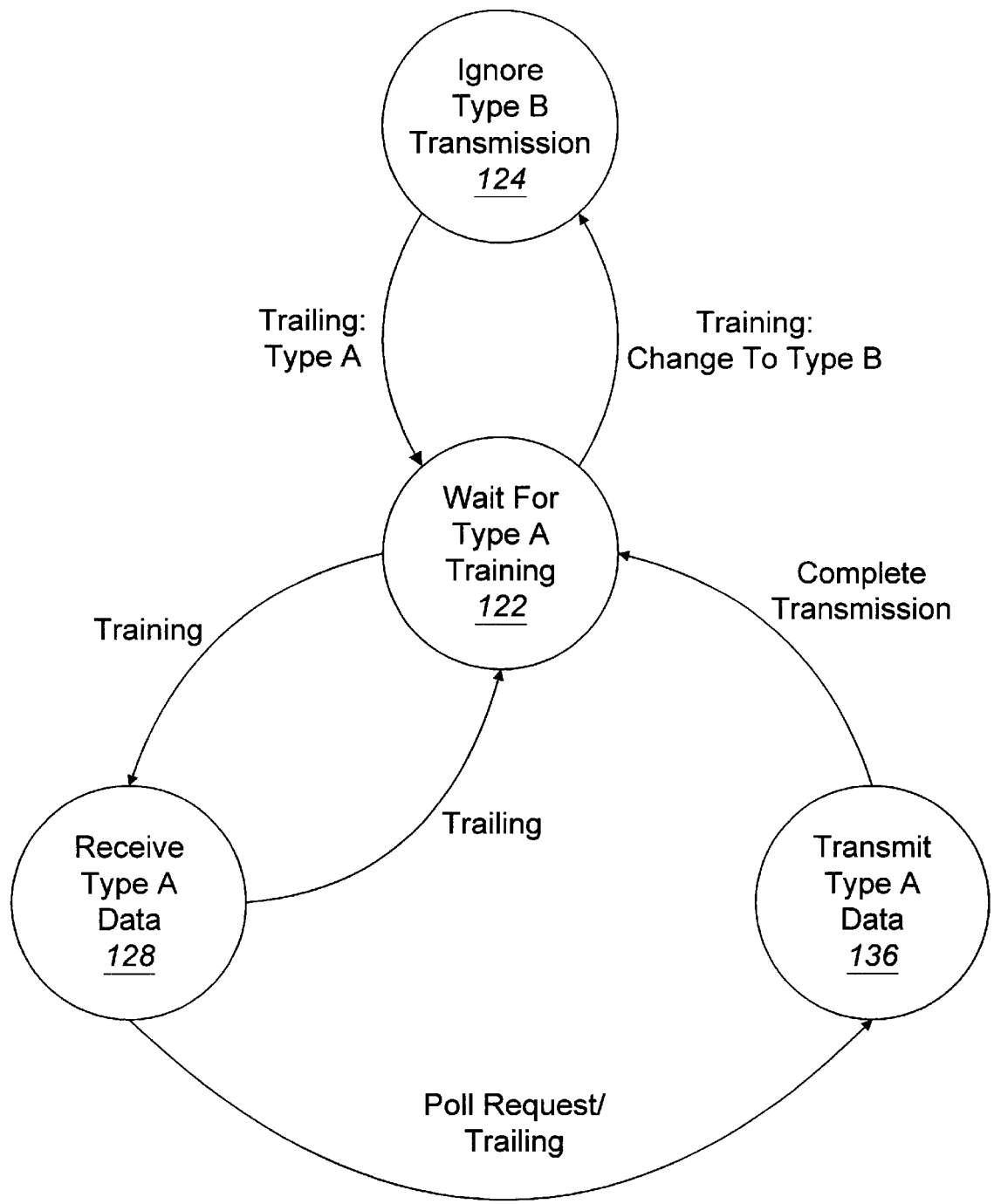
FIG. 7 is a state diagram for a tributary transceiver of FIGS. 3–5 using a primary modulation method in accordance with the principles of the present invention.

With reference to FIG. 5 and FIG. 7, a communication session between the master transceiver 64 and a type A trib 66a will now be discussed. A state diagram for a type A trib 66a is shown in FIG. 7. A type A trib 66a is initialized in state 122 in which it awaits a type A modulation training sequence. If, however, master transceiver transmits a training sequence in which the type A tribs 66a—66a are notified of a change to type B modulation as indicated by sequence 106, then a transition is made to state 124 where all type B transmissions are ignored until a type A modulation trailing sequence (e.g., sequence 114) is detected. Upon detecting the type A trailing sequence, a type A trib 66a returns to state 122 where it awaits a training sequence.

To initiate a communication session with a type A trib 66a, master transceiver 64 transmits a training sequence 126 in which an address of a particular type A trib 66a is identified. The identified type A trib 66a recognizes its own address and transitions to state 128 to receive data from master transceiver 64 as part of sequence 132.

After completing transmission sequence 132, master transceiver 64 transmits a trailing sequence 134 using type A modulation signifying the end of the current communication session. If master transceiver 64 has not transmitted a poll request to the type A trib 66a in sequence 132, then the type A trib 66a that was in communication with the master transceiver 64 will return to state 122 after receiving trailing sequence 134.

If, however, master transceiver 64 transmitted a poll request in sequence 132, then the type A trib 66a transitions to state 136 after receiving trailing sequence 134 where it will transmit training sequence 138, followed by data sequence 142, and terminated by trailing sequence 144 all using type A modulation. After completion of these transmissions, the type A trib 66a returns to state 122 to await the next type A modulation training sequence by master transceiver 64.

The control programs 78 and 92 of the present invention can be implemented in hardware, software, firmware, or a combination thereof. In the preferred embodiment(s), the control programs 78 and 92 are implemented in software or firmware that is stored in a memory and that is executed by a suitable instruction execution system.

The control programs 78 and 92, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims. Further, in the claims hereafter, the corresponding structures, materials, acts, and equivalents of all means or step plus function elements are intended to include any structure, material, or acts for performing the functions with other claimed elements as specifically claimed.

Therefore, having thus described the invention, at least the following is claimed:

1. A communication system, comprising:
   a master transceiver;
   a communication medium;
   a plurality of tributary transceivers in communication with said master transceiver over said communication medium, a first one of said tributary transceivers using a primary modulation method for communication over said communication medium and a second one of said tributary transceivers using a secondary modulation method for communication over said communication medium;
   said master transceiver including a processor and a storage medium in communication with said processor, said storage medium having program code for exchanging information over said communication medium, said program code comprising:
      first logic configured to establish said primary modulation method for communication over said communication medium;
      second logic configured to transmit a training sequence to notify said first one of said tributary transceivers of a change from said primary modulation method to said secondary modulation method;
      third logic configured to transmit information to and receive information from said second one of said tributary transceivers using said secondary modulation method;
      fourth logic configured to transmit a trailing sequence using said primary modulation method to notify said first one of said tributary transceivers of a change from said secondary modulation method to said primary modulation method; and
      fifth logic configured to transmit information to and receive information from said first one of said tributary transceivers using said primary modulation method;
   said first one of said tributary transceivers including a processor and a storage medium in communication with said processor, said storage medium having program code for exchanging information over said communication medium, said program code comprising:
      sixth logic configured to detect a change from said primary modulation method to said secondary modulation method;
      seventh logic configured to ignore transmissions on said communication medium using said secondary modulation method; and
      eighth logic configured to detect a trailing sequence transmitted using said primary modulation method after detecting a change from said primary modulation method to said secondary modulation method;
   said second one of said tributary transceivers including a processor and a storage medium in communication with said processor, said storage medium having program code for exchanging information over said communication medium, said program code comprising:
      ninth logic configured to receive information transmitted using said secondary modulation method; and
      tenth logic configured to ignore transmissions on said communication medium using said primary modulation method.

2. The communication system of claim 1, wherein said primary modulation method is selected from the group consisting of QAM, CAP, and DMT.

3. The communication system of claim 1, wherein said secondary modulation is selected from the group consisting of FSK and PAM.

4. The communication system of claim 1, wherein said third logic is configured to transmit a poll request as part of said information.

5. The communication system of claim 4, wherein said program code in said second one of said tributary transceivers further comprises eleventh logic configured to transmit information using said secondary modulation method in response to said poll request.

6. The communication system of claim 1, wherein said fifth logic is configured to transmit a poll request as part of said information.

7. The communication system of claim 6, wherein said program code in said first one of said tributary transceivers further comprises eleventh logic configured to transmit information using said primary modulation method in response to said poll request.

8. A master transceiver for use in a multipoint communication system, said communication system including a plurality of tributary transceivers in which a first one of said tributary transceivers uses a primary modulation method for communication and a second one of said tributary transceivers uses a secondary modulation method for communication, said master transceiver comprising:
  a processor;
  a storage medium in communication with said processor, said storage medium having program code for exchanging information with said tributary transceivers in said multipoint communication system, said program code comprising:
    first logic configured to establish said primary modulation method for communication over said communication medium;
    second logic configured to transmit a training sequence to notify said first one of said tributary transceivers of a change from said primary modulation method to said secondary modulation method;
    third logic configured to transmit information to and receive information from said second one of said tributary transceivers using said secondary modulation method;
    fourth logic configured to transmit a trailing sequence using said primary modulation method to notify said first one of said tributary transceivers of a change from said secondary modulation method to said primary modulation method; and
    fifth logic configured to transmit information to and receive information from said first one of said tributary transceivers using said primary modulation method.

9. The master transceiver of claim 8, wherein said primary modulation method is selected from the group consisting of QAM, CAP, and DMT.

10. The master transceiver of claim 8, wherein said secondary modulation is selected from the group consisting of FSK and PAM.

11. A tributary transceiver for use in a multipoint communication system, said communication system including a master transceiver that uses a plurality of modulation methods for communication, said plurality of modulation methods including a primary modulation method and a secondary modulation method, said tributary receiver comprising:
  a processor;
  a storage medium in communication with said processor, said storage medium having program code for exchanging information with said master transceiver in said multipoint communication system using said primary modulation method, said program code comprising:
    first logic configured to detect a change from said primary modulation method to said secondary modulation method;
    second logic configured to ignore transmissions on said communication medium using said secondary modulation method; and
    third logic configured to detect a trailing sequence transmitted by said master transceiver using said primary modulation method after detecting a change from said primary modulation method to said secondary modulation method.

12. The tributary transceiver of claim 11, wherein said primary modulation method is selected from the group consisting of QAM, CAP, and DMT.

13. The tributary transceiver of claim 11, wherein said program code further comprises fourth logic configured to transmit information to said master transceiver in response to a poll request from said master transceiver.

14. A method of communication between a master transceiver and a plurality of tributary transceivers connected by a communication medium, a first one of said tributary transceivers using a primary modulation method for communication and a second one of said tributary transceivers using a secondary modulation method for communication, said method comprising the steps of:
  said master transceiver establishing said primary modulation method as a current allowed modulation method;
  said master transceiver transmitting a training sequence to notify said first one of said tributary transceivers of a change from said primary modulation method to said secondary modulation method as the current allowed modulation method;
  said first one of said tributary transceivers detecting a change from said primary modulation method to said secondary modulation method as the current allowed modulation method;
  said master transceiver transmitting information to said second one of said tributary transceivers using said secondary modulation method;
  said first one of said tributary transceivers ignoring transmissions on said communication medium using said secondary modulation method;
  said master transceiver transmitting a trailing sequence using said primary modulation method to notify said first one of said tributary transceivers of a change from said secondary modulation method to said primary modulation method as the current allowed modulation method;
  said first one of said tributary transceivers detecting said trailing sequence;
  said master transceiver transmitting information to said first one of said tributary transceivers using said primary modulation method; and
  said second one of said tributary transceivers ignoring transmissions on said communication medium using said primary modulation method.

15. The method of claim 14, wherein said primary modulation method is selected from the group consisting of QAM, CAP, and DMT.

16. The method of claim 14, wherein said secondary modulation method is selected from the group consisting of FSK and PAM.

17. A computer readable medium having a program for controlling a master transceiver in a multipoint communication system, said communication system including a plurality of tributary transceivers in which a first one of said tributary transceivers uses a primary modulation method for communication and a second one of said tributary transceivers uses a secondary modulation method for communication, said program comprising:

first logic configured to establish said primary modulation method for communication over said communication medium;

second logic configured to transmit a training sequence to notify said first one of said tributary transceivers of a change from said primary modulation method to said secondary modulation method;

third logic configured to transmit information to and receive information from said second one of said tributary transceivers using said secondary modulation method;

fourth logic configured to transmit a trailing sequence using said primary modulation method to notify said first one of said tributary transceivers of a change from said secondary modulation method to said primary modulation method; and fifth logic configured to transmit information to and receive information from said first one of said tributary transceivers using said primary modulation method.

18. A computer readable medium having a program for controlling a first tributary transceiver using a primary modulation method in a multipoint communication system, said communication system including a second tributary transceivers using a secondary modulation method for communication and a master transceiver, said program comprising:

first logic configured to detect a change from said primary modulation method to said secondary modulation method;

second logic configured to ignore transmissions on said communication medium using said secondary modulation method; and third logic configured to detect a trailing sequence transmitted by said master transceiver using said primary modulation method after detecting a change from said primary modulation method to said secondary modulation method.

* * * * *